United States Patent [19]

Mahler

[11] Patent Number: 4,738,798

[45] Date of Patent: Apr. 19, 1988

[54] SEMICONDUCTOR COMPOSITIONS

[75] Inventor: Walter Mahler, Wilmington, Del.

[73] Assignee: E. I. Du Pont de Nemours and Company, Wilmington, Del.

[21] Appl. No.: 1,418

[22] Filed: Jan. 8, 1987

[51] Int. Cl.$^4$ ............................................. H01B 1/06
[52] U.S. Cl. .................................... 252/518; 252/519; 524/401; 524/413; 524/418; 524/420; 524/430; 524/431; 524/432; 524/434; 524/435
[58] Field of Search ................ 252/518, 519; 524/401, 524/413, 418, 420, 430, 431, 432, 434, 435

[56] References Cited

U.S. PATENT DOCUMENTS 4,412,938 11/1983 Kakizaki ............................. 252/511

OTHER PUBLICATIONS

Mau et al., J. Am. Chem. Soc., 106:6537-42 (1984).
Yamamoto et al., Inorganics Chimica Acta., 104:L1-L3 (1985).
Yamamoto et al., J. Materials. Sci. Lett., 5:132-134 (1986).
Hernglein, Ber. Bunsenges. Phy. Chem., 86:301-305 (1982).
Weller et al., Ber. Bunsenges. Phy. Chem., 88:649-656 (1984).
Rossetti et al., J. Chem. Phys., 83:1406-1410 (1985).

*Primary Examiner*—Josephine Barr

[57] ABSTRACT

A composition of matter comprising particles of semiconductor material in a copolymer matrix is disclosed.

16 Claims, No Drawings

SEMICONDUCTOR COMPOSITIONS

BACKGROUND OF THE INVENTION

1. Field of the Invention

The present invention relates to the field of photochemistry and, more particularly, semiconductor compositions.

2. Background of the Invention

It has recently become known that small semiconductor particles have desirable optical properties, such as nonlinearity, low light scattering, and a band-gap dependence on size. The following references disclose small metal sulfide particles in various media.

Mau et al., *J. Am. Chem. Soc.*, 106:6537–42 (1984) reports the construction, characterization, and evaluation of a system for photocatalytic hydrogen generation. The system comprises semiconductor (CdS) crystallites embedded in a polymer (Nafion ®) matrix that also contains a hydrogen-evolution catalyst (Pt). The average CdS crystal size in specified preparations was estimated to be about 20 nanometers. The optical properties of the CdS are similar to those of bulk CdS.

Yamamoto et al., *Inorganica Chimica Acta*, 104:L1–L3 (1985) discloses the preparation of organosols of CdS and CuS and their utilization in preparing MS-poly(acrylonitrile) composites (M=Cd, Cu). One of the uses of the organosols is said to be the preparation of composites of the metal sulfides with polymers. The composites are predicted to be useful in the manufacture of electronic devices. Yamamoto et al., *J. Materials. Sci. Lett.*, 5:132–134 (1986) discloses the electrical conduction properties of CuS- and CdS-polymer composites prepared by using organosols of CuS and CdS.

Henglein, *Ber. Bunsenges. Phy. Chem.*, 86:301–305 (1982) discloses the photo-degradation and fluorescence of colloidal-cadmium sulfide in aqueous solutions. Weller et al., *Ber. Bunsenges. Phy. Chem.*, 88:649–656 (1984) discloses absorption and fluorescence of small ZnS particles. The reference discloses the preparation of colloidal ZnS particles by photo-degradation of 3 nm particles or rapid precipitation in phosphate containing solution. Electron microscopy of the ZnS and CdS particles showed that they had a mean diameter of 3 nm.

Rossetti et al., *J. Chem. Phys.*, 83:1406–1410 (1985) discloses the synthesis of PbS crystals with a diameter of about 2.5 nanometers in low-temperature colloidal solutions. The optical and structural properties of the PbS crystals are reported.

It has been found that particles of semiconductor material can be prepared directly in a copolymer matrix. These compositions have desirable optical and mechanical properties at ambient temperature.

SUMMARY OF THE INVENTION

The invention provides a composition of matter comprising particles of semiconductor material in a copolymer matrix. The copolymer matrix comprises at least one α-olefin having the formula $RCH=CH_2$ where R is selected from hydrogen and straight or branched alkyl groups having from 1 to 8 carbon atoms, and at least one α,β-ethylenically unsaturated carboxylic acid having from 3 to 8 carbon atoms and 1 or 2 carboxylic acid groups. The copolymer matrix is further characterized by an α-olefin content of from about 75 to about 99 weight percent and an acid monomer content of from about 1 to about 25 weight percent.

The invention also provides a method for preparing the specified compositions. The method comprises contacting an ionic copolymer precursor with appropriate anions to form the particles of semiconductor material in the copolymer matrix.

DETAILED DESCRIPTION OF THE INVENTION

The invention provides a composition of matter comprising particles of semiconductor material in a specified copolymer matrix. It has been found that the band-gap energy of the specified particles is from about 10% to 1000% greater than that of the semiconductor material in bulk. Preferably, the particles of semiconductor material have a diameter less than about 20 nm, and most preferably less than about 15 nm. The present compositions absorb but do not scatter light and are useful as optical filters. Another advantage of the invention is that the compositions are extremely stable at about ambient temperature.

As used herein, the expression "semiconductor material" refers to material that in bulk has electrical conductivity intermediate to that of an insulator and a metal or a band-gap between about 0.2 and about 4 volts. Semiconductor materials suitable for employing in present compositions are known in the art. Preferably, the semiconductor material is selected from the group of cations consisting of $Cd^{++}$, $Zn^{++}$, $Pb^{++}$, $Cu^{++}$, $Co^{++}$, $Fe^{++}$, and $Ni^{++}$ in combination with at least one anion selected from the group consisting of $S^{--}$, $Se^{--}$, $I^-$, and $O^{--}$, and most preferably, from the group consisting of CdS, CdSe, CdO, ZnS, ZnSe, ZnO, PbS, PbSe, PbO, and $PbI_2$.

In the present compositions, the copolymer matrix comprises at least one α-olefin having the formula $RCH=CH_2$ where R is selected from hydrogen and straight or branched alkyl groups having from 1 to 8 carbon atoms, and at least one α,β-ethylenically unsaturated carboxylic acid having from 3 to 8 carbon atoms and 1 or 2 carboxylic acid groups. The α-olefin content of the copolymer matrix is from about 75 to about 99 weight percent, and the acid monomer content is from about 0.2 to about 25 weight percent. Optionally, the copolymer matrix can contain acid monomer in the form of an ester derived from an alcohol having from 1 to 8 carbon atoms. Preferred α-olefin and acid monomer contents are from about 80 to about 90 weight percent, and from about 10 to about 20 weight percent, respectively.

As indicated, the α-olefin employed in the copolymer matrix has the formula $RCH=CH_2$ where R is selected from hydrogen and straight or branched alkyl groups having from 1 to 8 carbon atoms. Thus, suitable olefins include ethylene, propylene, butene-1, pentene-1, hexene-1, heptene-1, 3-methylbutene-1 and 4-methylpentene-1. Preferably, the olefin is at least one selected from the group consisting of ethylene, propylene, and butene, and most preferably ethylene.

The second component of the copolymer matrix is at least one α,β-ethylenically unsaturated carboxylic acid having from 3 to 8 carbon atoms and 1 or 2 carboxylic acid groups. Suitable α,β-unsaturated acids include acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and the like. Preferably, the acid is at least one selected from the group consisting of acrylic and methacrylic acid, and most preferably methacrylic acid.

In one embodiment, the present composition is prepared by contacting an ionic copolymer precursor with appropriate anions to form the particles of semiconductor material in the copolymer matrix. The polymeric composition of the ionic copolymer precursor substantially corresponds to that of the desired copolymer matrix. The ionic copolymer precursor can be prepared by contacting a base copolymer with an ionizable metal compound according to the procedures disclosed in U.S. Pat. No. 3,264,272, the disclosure of which is incorporated herein by reference. The concentration of metal ion in the ionic copolymer precursor can be controlled by adding the desired amount of metal salt to the base copolymer or by taking the as-formed ionic copolymer and diluting it with non-metal ion containing copolymer. A second method for converting a base copolymer to its metal salt derivative is by contacting the base copolymer with a solution of the metal salt such as carboxylate. The concentration of the metal carboxylate in solution can be from about 0.1M to about 1M. The contact time of the base copolymer with the solution is from about 5 minutes to about 24 hours. The temperature of the reaction is from about 25° C. to about 100° C.

The method used for converting the base copolymer to the corresponding metal ion form is not critical to the invention. In preferred embodiments, the ionic copolymer precursor contains Pb in an amount from 0.01 to 20 weight percent, Cd in an amount from 0.01 to 10 weight percent, or Zn in an amount from 0.01 to 5 weight percent. It is to be understood that any combination of the specified metals may be present in the ionic copolymer precursor. In addition, the remaining free carboxylic acid groups of the ionic copolymer precursor, i.e. the COOH groups which do not have any of the above listed metals attached to them, before or after conversion of the metal ion to the semiconductor, may have $H^+$ replaced with other metal ions such as $Li^+$, $Na^+$, $K^+$, $Rb^+$, $Cs^+$, $Be^{++}$, $Mg^{++}$, $Ca^{++}$, $Sr^{++}$, $Ba^{++}$, $NR_4^+$, $Cu^{++}$, $Cr^{++}$, $Co^{++}$ and $Ni^{++}$, where R is, independently, selected from the group consisting of straight and branched alkyl groups having from 1 to 6 carbon atoms and hydrogen.

The ionic copolymer precursor can be pressed into films or the metal ions can be introduced into the film or coating after they have been formed by imbibement. For use as optical filters, the films can range in thickness from about 0.01 mm to about 10 mm and the coatings can range from about 0.001 mm to about 0.1 mm.

In the present method, metal ions contained in the ionic copolymer precursor are converted to the desired particles of semiconductor material by contacting the ionic copolymer with appropriate anions. As used herein, the expression "appropriate anions" refers to the anion required for preparing desired semicoductor particles. For the preparation of particles of preferred semiconductor materials, appropriate anions are selected from the group consisting of $S^{--}$, $Se^{--}$, $I^-$, and $O^{--}$. In one embodiment, the ionic copolymer precursor is contacted with gaseous $H_2S$, $H_2Se$, HI or $NH_3(H_2O)$. The pressure of the gas is not critical. The pressure can be from about 0.1 mm to about 7600 mm, and preferably from about 10 mm to about 760 mm. The contact time is not critical. Suitable contact times can range from 1 minute to about one week or more, and preferably from about 3 minutes to about 120 minutes. The temperature of the reaction can be from about 0° C. to about 200° C., and preferably from about 25° C. to about 150° C.

The metal ions contained in the ionic copolymer precursor can also be converted to the desired semiconducting particles by contacting the copolymer with aqueous solutions of $S^{--}$, $Se^{--}$, $I^-$, or $OH^-$. The anion concentrations in such solution can be from about 0.1M to about 5M. The preferred range is from about 0.2M to about 1M. The contact time can range from about one minute to about 72 hours. The preferred range is from about 5 minutes to about 1 hour. The temperature of the reaction can be from about 20° C. to about 100° C.

The present invention is further described in the following Examples, wherein all parts and percentages are by weight and degrees are Celsius. Particle sizes in the examples were determined by electron microscopy, line broading of the X-ray diffraction pattern or by measurement of the band-gap energy. A value for the band-gap energy greater than that observed for the bulk material indicates the presence of particles having a diameter of less than about 20 nm.

EXAMPLE 1

Preparation of PbS in Copolymer with $H_2S$

An ethylene-15% methacrylic acid copolymer containing 20% lead was prepared by mixing 100 g of the specified copolymer with 45 g of lead acetate at 190° in a Banbury mixer. The resulting ionomer was pressed into a film having a thickness of 0.013 cm. The film was exposed to about one millimole of gaseous hydrogen sulfide at 23° C. The film rapidly became transparent brown and after two hours was black. X-ray diffraction measurements made on such a film showed that it contained PbS crystals. The line broadening of the X-ray pattern showed that the PbS crystals were about 4.5 nanometers in diameter. The absorption spectrum showed that the film absorbed all light in the visible region, and was essentially transparent above 1200 nm. Above that wavelength there was no detectable light scattering, consistent with the measurement that the particle size of the PbS was much smaller than the wavelength of light.

EXAMPLE 2

Preparation of PbS in Copolymer with $Na_2S$

A film of ethylene-15% methacrylic acid copolymer containing 20% Pb was prepared substantially according to the method described in Example 1. The film was immersed in 1M aqueous sodium sulfide at ambient temperature. The film slowly turned brown and was black in one day. Electron microscopy showed that the PbS crystals had a diameter of about 5 nm.

EXAMPLES 3-6

Preparation of PbS in Copolymer with $H_2S$

An ethylene-15% methacrylic acid copolymer containing 20% Pb was prepared substantially according to the method described in Example 1. The Pb ionomer was extruded and cut into pellets. The pellets were mixed with ethylene-15% methacrylic acid copolymer in various proportions to generate Pb concentrations from about 0.1 to 20%. The resulting Pb ionomers were pressed into films having a thickness of 0.15 mm at about 160°. The resulting films were optically clear and transparent from about 220 to 4000 nanometers. These films were exposed to gaseous hydrogen sulfide at 25° for two hours or more. The particle sizes of the lead sulfide was determined by X-ray line broadening and the band gap was measured from the absorption spectrum. The results are shown in Table 1.

TABLE 1

| Example | Pb conc. (%) | Size (nm) | Band-gap (eV) |
|---|---|---|---|
| 3 | 20.0 | 4.5 | .91 |
| 4 | 13.0 | 3.5 | 1.12 |
| 5 | 6.8 | 2.5 | 1.8 |
| 6 | 0.2 | <2.0 | 2.3 |

The film prepared in Example 5 was used as an optical filter and found to transmit light above 700 nm.

EXAMPLE 7

Preparation of PbS in Copolymer at Elevated Temperatures

An ethylene-15% methacrylic acid copolymer containing 20% Pb was prepared substantially according to the procedure described in Example 1. The Pb iomomer was pressed into a film having a thickness of 0.15 mm. The film was heated to 120° and then exposed to gaseous hydrogen sulfide for about 3 minutes. The resulting film showed green and violet iridescence. X-ray line broadening showed that the PbS particle size was about 12.5 nm. The band gap was measured as 0.46 eV, compared to the known value of 0.41 eV for conventional bulk PbS. This film used as an optical filter transmitted light above 2000 nm.

EXAMPLES 8-10

Preparation of PbO in Copolymer

Films of ethylene-15% methacrylic acid copolymer containing 20%, 1%, and 0.2% Pb were prepared substantially as described in Examples 3-6. The Pb ionomers were heated to 150° and exposed to gaseous ammonia in the presence of water. Band gaps for the resulting compositions were 4.2, 4.5, and 4.6 eV respectively. Comparison may be made to bulk orthorhombic lead oxide with a band-gap of 3.36 eV. The absorption spectrum for the PbO made from the 0.2% Pb film showed a peak at 248 nm with a molar extinction coefficient of 12,000 L/(mol×cm) and a very sharp peak at 242 nm with a molar extinction coefficient of 22,000 L/(mol×cm). The sharp peak was absent in other preparations. The band-gap energy revealed that the semiconductor particles were less than 15 nm in diameter.

EXAMPLES 11-15

Preparation of PbSe in Copolymer

Films of ethylene-15% methacrylic acid copolymer containing the concentrations of lead specified in Table 2 were prepared substantially according to the procedure described in Examples 3-6. The films were exposed to 100 mm hydrogen selenide gas for at least forty minutes at ambient temperature. There was indication of substantial reaction within one minute. The band-gaps of the resulting compositions are shown in Table 2.

TABLE 2

| Ex. | Molarity of PbSe in Polymer | Band-gap (eV) |
|---|---|---|
| 11 | 1 | 0.86 |

TABLE 2-continued

| Ex. | Molarity of PbSe in Polymer | Band-gap (eV) |
|---|---|---|
| 12 | 0.5 | 1.2 |
| 13 | 0.25 | 1.4 |
| 14 | 0.1 | 1.55 |
| 15 | 0.005 | 1.90 |

The band-gap of bulk PbSe is 0.25 eV. The band-gap energies revealed that the semiconductor particles in these Examples were less than 10 nm in diameter.

EXAMPLE 16

Preparation of ZnS in Copolymer

Ethylene-15% methacrylic acid copolymer was partially neutralized with zinc by mixing 500 g of the specified acid copolymer with 41.5 g $Zn(CH_3COO)_2.2H_2O$ on a two roll mill at 170°. The resulting 2.4% Zn ionomer was pressed into films and further diluted with the same acid copolymer to generate films having zinc concentrations of 0.11%. The films were exposed to hydrogen sulfide gas at ambient temperature. The resulting films remained colorless. Measurement of the refractive index of an untreated film containing 2.4% zinc gave a value of 1.503. After hydrogen sulfide treatment the refractive index was 1.510. Measurement of the absorption spectra showed that the ZnS formed from the film that contained 2.4% Zn had a band-gap of 3.9 eV. The band-gap of the film containing 0.11% Zn was 4.7 eV, compared to the known value of 3.5 eV for bulk ZnS. X-ray diffraction showed an absence of semiconductor particles greater than 2.5 nm in diameter.

EXAMPLE 17

Preparation of ZnSe in Copolymer

The procedures described in Example 16 were substantially repeated except that hydrogen selenide was used instead of hydrogen sulfide. The composition prepared from 2.4% ZnSe had a band gap of 3.30 eV and that from 0.11% Zn had a band gap of 3.54 eV compared to the known bulk value for ZnSe of 2.58 eV. X-ray diffraction showed an absence of semiconductor particles greater than 2.5 nm in diameter.

EXAMPLE 18

Preparation of PbI2 in Copolymer

A ethylene-15% methacrylic acid copolymer containing 0.1% Pb was prepared by mixing 0.1 g of the copolymer containing 20% Pb prepared in Example 1 with 20 g of the acid copolymer and pressing the resulting mixture repeatedly at 160° in a film press. The film containing 0.1% Pb was exposed to hydrogen iodide gas. The film turned yellow and the absorption spectrum showed a peak at 400 nm with a molar extinction of 10,000 L/(mol×cm). Bulk lead iodide has its absorption peak at 500 nm.

A second film was prepared substantially as described above from the copolymer containing 20% Pb without dilution. This film was exposed to hydrogen iodide and became intensely yellow. Examination of the film in cross section showed it to consist of many dense layers of variable thickness and spacings. Most of the layers were about 0.4 mm in thickness. The layers were about ten times thicker when the procedure was substantially repeated except that exposure to hydrogen iodide was done on film heated to 125° C. Some small regions of iridescence (interference colors) were also seen in the high temperature preparation. The band-gap energies revealed that the semiconductor particles were less than 10 nm in diameter.

EXAMPLE 19

Preparation of PbS in Copolymer

Films of ethylene-15% methacrylic acid having a diameter of 8 cm and a thickness of 0.25 mm were immersed in a solution of 5 ml lead(II)2-ethylhexanoate in 20 ml decane for a period of 1, 2, or 24 hours. The films were then rinsed with hexane, dried and then exposed to hydrogen sulfide gas. The absorption spectra of the films were similar to those obtained in Example 3. The adsorption spectra of the films showed that 0.13% Pb had been imbibed in one hour, 0.19% Pb in 2 hours and 2.8% Pb in 24 hours. Immersion of the copolymer in the same solution at 100° for 15 minutes caused 20% Pb to be imbibed. The particle size of the PbS formed from the 0.19% and 2.8% Pb samples were less than 2.5 nm, and that from the 20% sample was about 5 nm.

EXAMPLE 20

Preparation of CdS in Copolymer

A copolymer consisting of 69% ethylene, 20.5% acrylic acid and 9.5% butyl acrylate (10 g) was dissolved in 100 ml of tetrahydrofuran. The resulting mixture was spin coated onto a glass disk to form a 3 micron thick layer of the copolymer. The coated glass disk was immersed in 1M aqueous cadmium acetate at 100° for 5 minutes, rinsed with water and air dried. This preparation was exposed to hydrogen sulfide gas at room temperature. The copolymer coating remained colorless. An absorption spectrum of the coated disk showed a shoulder at 345 nm and a band-gap of 3.1 eV. After heating the coated disk to 150° the film became yellow and the adsorption spectrum now had a shoulder of 430 nanometers and a band gap of 2.6 eV. Bulk CdS is known to have a band gap of 2.5 eV. The CdS having the 3.1 eV band-gap had a particle size of about 1 nm and the CdS with the 2.5 eV band-gap was about 10 nm.

EXAMPLE 21

Preparation of PbS in Copolymer

A 3 micron thick coating of a copolymer of 25% styrene, 30% ethyl methacrylate, 21% ethyl acrylate and 24% methacrylic acid was coated from a tetrahydrofuran solution onto a polyester film commercially available from E. I. du Pont de Nemours and Company under the registered trademark Mylar. The coated film was immersed in 0.5M aqueous lead acetate at 70° for 15 minutes, rinsed with water, dried and then exposed to hydrogen sulfide for 5 minutes. The film turned yellow and had an absorption spectrum similar to that for PbS having a particle size less than 2 nanometer.

EXAMPLE 22

Preparation of PbS/ZnS in Copolymer

One gram of ethylene-15% methacrylic acid copolymer containing 20% Pb was blended with 4 g of ethylene-15% methacrylic acid copolymer containing 2.4% Zn to form a copolymer containing 4% Pb and 1.9% Zn. A film of the resulting composition was exposed to hydrogen sulfide and turned deep yellow. A film of 4% Pb in the same copolymer turned deep red when exposed to hydrogen sulfide. Measurement of the band-gap for the resultant 4.6% PbS/2.8% ZnS composition gave a value of 2.75 eV compared to a band-gap of 1.85 eV for 4.6% PbS in copolymer. The semiconductor particle size in these compositions was less than about 5 nm.

EXAMPLE 23

Preparation of PbS in Copolymer

Pellets of ethylene-15% methacrylic acid containing 20% $Pb^{++}$ were prepared substantially as described in Example 1. By substantially the same method, except employing sodium acetate instead of lead acetate, pellets of ethylene-15% methacrylic acid containing 2.4% $Na^+$ were prepared. The pellets containing the $Pb^{++}$ and those containing the $Na^+$ were mixed in the ratio of 1:3 and a film was pressed from the resulting mixture to give a composition containing 5% $Pb^{++}$ and 1.8% $Na^+$. The film was exposed to hydrogen sulfide at 25°. The resulting film was orange and absorbed essentially all light below 700 nm and essentially none above 700 nm. The film transmitted 70% of the white light of an incandescent light bulb. The film was then heated at 150° for a few minutes. The resulting film was black and transmitted essentially no light. The semiconductor particles size were found to be about 1.5 nm before heating and about 5 nm after heating. Measurements of the transmission of light as a function of time at different temperatures showed that the half-life of the transformation was 0.1 minute at 150°, 90 minutes at 125°, and 7 days at 100°. Extrapolation to 25° showed that the half-life at ambient temperature would be about 20,000 years.

EXAMPLE 24

Preparation of Copolymer with Cu, Co, and Ni Sulfides

Ethylene-15% methacrylic acid was mixed with acetates of copper, cobalt, and nickel at 240° in a Banbury mixer to yield metal concentrations of about 2%. Films of the metal ionomers were pressed at 160°. The resulting films were exposed to hydrogen sulfide. The film containing copper required about one hour to react fully with the hydrogen sulfide at 25°, giving a yellow-brown transparent film. The films containing cobalt and nickel did not react with hydrogen sulfide at ambient temperature. At about 125° these films became black on reflection, but still transmitted light.

What is claimed is:

1. A composition of matter comprising particles of semiconductor material selected from the group of cations consisting of $Cd^{++}$, $Zn^{++}$, $Pb^{++}$, $Cu^{++}$, $Co^{++}$, $Fe^{++}$, and $Ni^{++}$ in combination with at least one anion selected from the group consisting of $S^{--}$, $Se^{--}$, $I^-$, and $O^{--}$ in a copolymer matrix; said copolymer matrix comprising at least one α-olefin having the formula $RCH=CH_2$ where R is selected from hydrogen and straight or branched alkyl groups having from 1 to 8 carbon atoms, and at least one α,β-ethylenically unsaturated carboxylic acid having from 3 to 8 carbon atoms and 1 or 2 carboxylic acid groups; and said copolymer matrix further characterized by an α-olefin content of from about 75 to about 99 weight percent and an acid monomer content of from about 1 to about 25 weight percent.

2. A composition as defined in claim 1, wherein the particles of semiconductor material have a diameter less than about 20 nm.

3. A composition as defined in claim 2, wherein the particles of semiconductor material have a diameter less than about 15 nm.

4. A composition as defined in claim 2, wherein the semiconductor material is selected from the group of cations consisting of $Cd^{++}$, $Zn^{++}$, $Pb^{++}$, $Cu^{++}$, $Co^{++}$, $Fe^{++}$, and $Ni^{++}$ in combination with at least one anion selected from the group consisting of $S^{--}$, $Se^{--}$, $I^-$, and $O^{--}$.

5. A composition as defined in claim 4, wherein the semiconductor material is selected from the group consisting of CdS, CdSe, CdO, ZnS, ZnSe, ZnO, PbS, PbSe, PbO, and $PbI_2$.

6. A composition as defined in claim 5, wherein the α-olefin and acid monomer contents are from about 80 to about 90 weight percent and from about 10 to about 20 weight percent, respectively.

7. A composition as defined in claim 5, wherein the α-olefin is at least one selected from the group consisting of ethylene, propylene, and butene.

8. A composition as defined in claim 7, wherein the α-olefin is ethylene.

9. A composition as defined in claim 8, wherein the α,β-ethylenically unsaturated carboxylic acid is at least one selected from the group consisting of acrylic and methacrylic acid.

10. A composition as defined in claim 9, wherein the α,β-ethylenically unsaturated carboxylic acid is methacrylic acid.

11. A method for preparing the composition of matter of claim 1 comprising contacting an ionic copolymer precursor comprising (1) a base copolymer matrix comprising at least one α-olefin having the formula $RCH=CH_2$ where R is selected from hydrogen and straight or branched alkyl groups having from 1 to 8 carbon atoms, and at least one α,β-ethylenically unsaturated carboxylic acid having from 3 to 8 carbon atoms and 1 to 2 carboxylic acid groups, said copolymer matrix further characterized by an α-olefin content of from about 75 to about 99 weight percent and an acid monomer content of from about 1 to about 25 weight percent and (2) at least one cation selected from the group consisting of $Cd^{++}$, $Zn^{++}$, $Pb^{++}$, $Cu^{++}$, $Co^{++}$, $Fe^{++}$ and $Ni^{++}$, with anions selected from the group consisting of $S^{--}$, $Se^{--}$, $I^-$, and $O^{--}$ to form the semiconductor particles in the copolymer matrix.

12. A method according to claim 11, wherein the ionic copolymer precursor contains Pb in an amount from 0.01 to 20 weight percent.

13. A method according to claim 11, wherein the ionic copolymer precursor contains Cd in an amount from 0.01 to 10 weight percent.

14. A method according to claim 11, wherein the ionic copolymer precursor contains Zn in an amount from 0.01 to 5 weight percent.

15. A method according to claim 11, wherein the ionic copolymer precursor is contacted with gaseous $H_2S$, $H_2Se$, HI or $NH_3(H_2O)$.

16. A method according to claim 11, wherein the ionic copolymer precursor is contacted with aqueous solutions of $S^{--}$, $Se^{--}$, $I^-$, or $OH^-$.

* * * * *

UNITED STATES PATENT AND TRADEMARK OFFICE
CERTIFICATE OF CORRECTION

PATENT NO. : 4,738,798

DATED : April 19, 1988

INVENTOR(S) : Walter Mahler

It is certified that error appears in the above-identified patent and that said Letters Patent is hereby corrected as shown below:

Col. 5, line 23: "iomomer" should be --ionomer--.

Signed and Sealed this

Seventeenth Day of January, 1989

Attest:

DONALD J. QUIGG

Attesting Officer

Commissioner of Patents and Trademarks